Feb. 14, 1956    R. N. McKNIGHT    2,734,934
INSULATED CONDUCTOR AND METHOD OF MAKING SAME
Filed July 15, 1954
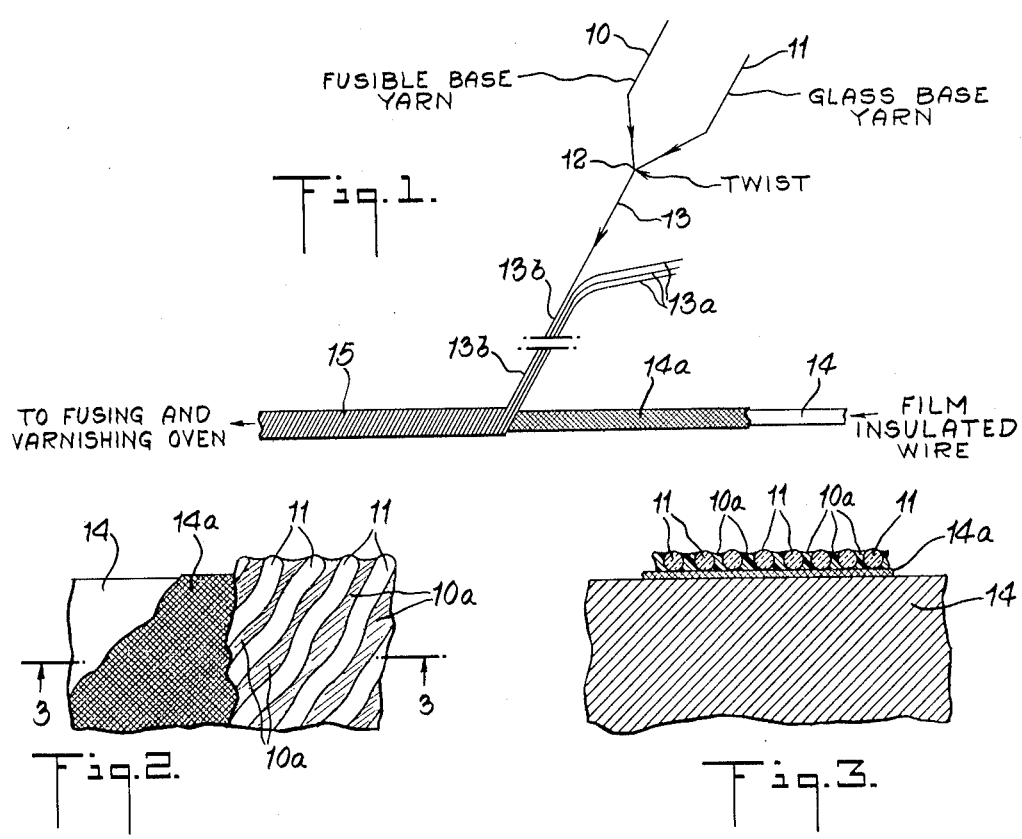
INVENTOR.
ROBERT N. McKNIGHT
BY
Davis, Hoxie & Faithfull
ATTORNEYS United States Patent Office 2,734,934
Patented Feb. 14, 1956

2,734,934

INSULATED CONDUCTOR AND METHOD OF MAKING SAME

Robert N. McKnight, Fort Wayne, Ind., assignor to Phelps Dodge Copper Products Corporation, Fort Wayne, Ind.

Application July 15, 1954, Serial No. 443,650

3 Claims. (Cl. 174—121)

This invention relates to insulating coverings for electrical conductors. It has particular reference to an improvement in insulated conductors employing glass in fiber form as an insulating medium, and to a novel method of making such conductors.

Glass in fiber form has been used for many years as an insulating covering for electrical conductors, such as magnet wire. Generally, continuous filament glass yarn is formed into multiple parallel ends composing a serving yarn which is wrapped around the wire in one or more layers, the resulting covering being then impregnated with a suitable varnish and baked. When used for the windings of electric motors, for example, this wire provides a positive inorganic spacer between the wire turns and permits the motors to be operated at higher temperatures, that is, temperatures up to 130° C. (class B) when using a conventional oil types varnish or up to 180° C. (class H) using a silicone modified varnish impregnant.

Glass-insulated wire as made heretofore, however, has certain disadvantages which have limited its use. It has extremely poor flexibility, which gives the glass insulation a strong tendency to crack or open up when the wire is bent. It has poor resistance to abrasion and a poor space factor, the latter being usually due to the application of a considerable quantity of varnish to the insulation in an effort to improve its abrasion-resistance. Also, the varnished glass insulation does not adhere well to the underlying wire. These disadvantages have been recognized for many years, and in spite of attempts which have been made to overcome them, they still constitute major limiting factors in the use of glass-insulated wire.

I have discovered that glass-insulated wire can be greatly improved in the respects noted above by combining the glass fibers with a fusible fibrous organic dielectric material of certain characteristics to form a composite yarn in which the fusible organic material is mixed intimately as fibers with the glass fibers. When this composite yarn is wrapped on the wire and the fusible organic fibers are fused in situ, a substantially continuous insulation is formed in which the glass fibers of the composite serving yarn are firmly embedded in and substantially surrounded by the fusion product of the fibrous organic material. Due to the high melting point of glass, and its immunity to the effects of solvents for the organic material or the fused organic material itself, the glass fiber portion of the composite yarn on the wire will be unaffected by the fusing operation, regardless of whether the organic dielectric material is fused chemically or thermally.

Glass fibers when served conventionally on wire must be impregnated and coated with a baked resinous varnish to give some degree of protection to the fragile and inflexible glass fibers. Adequate insulation flexibility, abrasion resistance, forming properties, and adhesion cannot be obtained, however, by this varnish impregnation and bake because the close packing of the wrapped glass fibers prevents any substantial penetration of the impregnating varnish. A build-up of varnish on the outside of the glass fiber serving helps only to a small degree while giving a larger diameter wire and thus a poorer space factor.

According to the present invention, the fusible organic fiber portion of the aforementioned composite yarn when fused, serves as the impregnant or bonding agent for the glass fibers and imparts superior physical properties to the insulated wire. In this manner, the impregnant or bonding agent can be introduced more effectively than is possible by applying it in the conventional manner to the glass fibers after they are served on the wire. Moreover, the proportion of impregnant or bonding agent is constant from area to area of the insulation and from wire to wire, whereas the proportion of impregnant on a conventional insulation of glass fibers can vary over a considerable range. Also, the application of the impregnant in this manner makes it feasible to use as the impregnant a material which is impossible or inconvenient to apply as a varnish because of its insolubility or other considerations.

The insulated wire made according to the present invention provides basically a positive inorganic glass spacer between turns of the wire when wound in a coil, as heretofore, and yet it overcomes the limitations of conventional glass-insulated wire. It has a high order of abrasion resistance, much greater flexibility, and remarkably improved adhesion of the insulation to the underlying conductor. In addition, the insulated wire has a lower insulation build and thus a better space factor. Consequently, the invention enables a much wider application of glass-insulated wire.

The glass fiber portion of the composite insulation provides the essential positive inorganic spacer to maintain wire to wire separation in coils or windings operated at temperatures at or over 130° C. The impregnant or bonding agent serves to protect the brittle and inflexible glass fibers from stretching, twisting, bending and scraping during manufacture, handling and winding of the wire into coils. Once the windings are completed, slight softening and some embrittlement of the bonding agent at the operating temperature are not detrimental, since the glass fibers perform as the positive insulation. However, it is important that carbonization of the bonding agent be avoided at the operating temperature, since carbon is to a certain degree an electrical conductor and will allow electrical tracking, shorts and hot spots.

As previously indicated, the organic dielectric material is one which is fusible and can be made in the form of a filament or fiber, so that it can be combined with the glass fibers and the composite yarn wrapped on the wire in the conventional manner. Preferably, it is a thermoplastic resin having a fusing temperature above 200° C. and well below the melting point of glass, and the fusing is effected by heating the wrapped wire to or somewhat above the fusing temperature of the resin. For best results, the organic dielectric material selected for the fusible fiber should be quite adhesive in its properties so that it will adhere to glass and copper and also to any underlying coat of baked varnish or other insulating film; and it should have good strength, toughness and aging properties and good chemical-heat resistance so that it can be held at a temperature of about 130° to 180° C. without becoming carbonized or markedly embrittled or otherwise deteriorated. There are numerous resins which will qualify sufficiently as to many of these properties, but for practical reasons the selection will usually be made from those which are available commercially in filament form. I have found that the condensation polymer of terephthalic acid and ethylene glycol (Dacron) is especially suitable. Not only does it possess all of the properties noted above to a high degree, but it has good resistance to solvents and excellent chemical life (it does not oxidize or deteriorate markedly at operating temperatures in the range of 130° to 180° C.) and it is well adapted for high speed wire wrapping operations. For illustrative purposes, therefore, the invention will be described in more detail hereinafter with reference to Dacron as the fibrous organic dielectric material, although it will be understood that other fibrous organic dielectric materials may be used which have essentially the same properties as Dacron.

In the preferred practice of the invention, the Dacron yarn in the form of many individual filaments is combined with the glass yarn, also in the form of many individual filaments, by twisting the different yarns together to form an end, which end is multiplied in parallel to form a combined serving yarn which is wrapped around the conductor in one or more layers or servings in a manner similar to the way glass fiber yarn is conventionally applied to conductors. The wrapped wire is then passed through an oven at a temperature in the range of 250° to 500° C., so that the Dacron is quickly fused. Due to the fact that the Dacron fibers have been twisted around the glass fibers in each end of yarn, the Dacron fuses between the turns of the glass fibers on the conductor and to the conductor itself, thereby forming a substantially continuous insulation containing the turns of unfused glass fibers. To improve the appearance of the insulated wire, a thin coat of a suitable varnish may be applied to the glass-Dacron wrapping during the fusing operation, in order to hold down any fibers which might have broken loose during the wrapping operation.

Other ways of combining the Dacron fibers and the glass fibers into a serving yarn may be used. The serving yarn may be constructed of alternate ends or yarns of Dacron fibers and glass fibers. Also, each end may be constructed of many small fibers of both Dacron and glass intimately and uniformly mixed and in varying proportions, plied and twisted as in conventional glass serving yarn.

If desired, a film insulation may be applied to the conductor before wrapping it with the glass and Dacron fibers, so that the film insulation will underlie the glass turns and the fusion product.

For a better understanding of the invention, reference may be had to the accompanying drawing, in which:

Fig. 1 is a schematic view of a method of insulating wires according to the invention, showing the formation of the composite glass-Dacron yarn and the wrapping of the yarn on the conductor;

Fig. 2 is an enlarged side elevational view of part of the insulated wire after the fusing operation;

Fig. 3 is a sectional view on the line 3—3 of Fig. 2.

In the preferred practice of the invention, as illustrated in Fig. 1, a Dacron or fusible base yarn 10 is combined with a glass base yarn 11 by twisting the two yarns together, as shown at 12, to form an end 13. The yarn end 13 is then multiplied with similar yarn ends 13a to form a serving yarn 13b consisting of parallel ends each having the twisted yarns 10 and 11 of the fusible base material and glass, respectively. The serving yarn 13b is thus made in a manner similar to the way glass serving yarn is manufactured, except that instead of twisting two glass yarns to form the end 13, I twist one glass yarn and one fusible yarn.

The composite serving yarn 13b is wound on a suitable package (not shown) of the kind used in conventional high-speed automatic serving machines for wrapping wires. The wire 14 to be insulated is passed through the serving machine and is there wrapped with at least one serving of the serving yarn 13b, similar to the way glass yarn is applied to such wires. As a result, the fusible yarn 10 is wrapped around the conductor 14 in intimate contact with the glass yarn 11, the turns of these two different yarns forming a covering 15. If desired, the wire 14, prior to the application of the covering 15, may be provided with a baked film insulation 14a. The under-coating of film insulation 14a may be a conventional oil type oleo-resinous varnish, polyvinyl acetal (Formvar) polyamid (nylon), polyvinyl acetal plus nylon (Nyform), or other synthetic resin insulation.

After the winding operation, the conductor 14 with its covering 15 is passed through an oven (not shown) and there heated to a temperature in the range of approximately 250° to 500° C., which causes the Dacron yarn 10 to be fused quickly. It is desirable, in order to improve the appearance of the product, to combine this fusing operation with the application of a very thin coating of a suitable varnish to the covering 15 in a manner conventionally used to apply varnish to glass-served wire. In this way, any loose glass fibers which may have broken during the serving operation are tied down by the varnish during the fusing operation and will not project from the surface of the insulation.

By heating the wrapped covering 15 to the fusing temperature of the Dacron yarn 10, as described, the latter is fused in place on the wire conductor and in intimate contact with the glass yarn 11, which is not affected by the heating. Thus, the heating results in a partially fused insulation consisting of the unfused glass yarn 11 and the fusion product of the Dacron yarn 10. The Dacron, being twisted around the glass yarn, fuses between the turns of the glass yarn and to the bare conductor 14 or the insulating film coating 14a thereon, as shown at 10a in Figs. 2 and 3. Consequently, the fused Dacron 10a forms a practically continuous insulation in which the unfused glass yarn 11 is firmly embedded. In other words, the fused Dacron 10a acts to hold the turns of the glass yarn 11 together and bind them to the conductor 14.

Tests have shown that an insulated wire made as described above represents a very substantial improvement in abrasion resistance, adhesion, flexibility and space factor, as compared with wire which is insulated conventionally with glass yarn and varnished. A table based upon comparative tests, and showing the improvement in these respects, appears below.

*Comparison of #16 copper wire having standard double serving of glass yarn (A) with similar wire having double serving of glass-Dacron (B)*

| Sample | A | B |
| --- | --- | --- |
| Diameter Increase | .0086″–.0089″ | .0070″–.0072″. |
| Abrasion Scrape: | | |
| .045″ Needle—650 grams (Standard) | 128 cycles | 1,000 plus cycles. |
| .045″ Needle—1,300 grams (Double) | 13 cycles | 75 cycles. |
| Elongation to Break | Tubing and fraying, No adhesion. | No tubing or fraying, Excellent adhesion. |
| 1X Mandrel | Glass servings separate. | No separation occurs. |
| Dielectric in Lead Shot | 600–800 volts | 700–800 volts. |

Because of its improved flexibility, the insulated covering of the present invention, even on difficult applications, will remain intact on the wire during fabrication and assembly operation, as in the manufacture of electric motors, etc. To take one example, the insulated covering of the invention, when applied to wire of rectangular cross section, enables the wire to be bent or wound edgewise without impairing the insulation, which is a distinct advantage in motor manufacture. There are many instances in which wires of rectangular section are required to be bent sharply on edge; but experience has indicated that practically all glass insulated wires of the conventional kind (glass fibers and varnish) will break or crack at the insulation when so wound, causing a substantial fraying of the insulation. However, by insulating such wires in accordance with the present invention, they may be wound edgewise without rupture of the insulation, so that the insulation remains as a positive inorganic sapcer between the wire turns over the full length of the wire.

I claim:

1. An electrical conductor having an insulation covering which comprises the product of partial fusion of a composite yarn wrapped around the conductor, said yarn as so wrapped including an intimate mixture of glass fibers and fibers of a fusible organic dielectric material which is non-carbonizing at temperatures up to about 180° C. and has a substantially higher fusing temperature, said organic material being fused in situ on the conductor, whereby said fused material is in intimate contacts with the glass fibers and acts to hold the glass fibers together and bind them to the conductor.

2. An electrical conductor according to claim 1, in which said organic material is a condensation polymer of terephthalic acid and ethylene glycol.

3. An electrical conductor according to claim 1, comprising also a baked film insulation on the conductor underlying the glass fibers and said fused organic material.

References Cited in the file of this patent

UNITED STATES PATENTS

| 2,013,686 | Homer | Sept. 10, 1935 |
| 2,252,999 | Wallach | Aug. 19, 1941 |
| 2,262,861 | Rugeley | Nov. 18, 1941 |
| 2,504,845 | Keyes | Apr. 18, 1950 |
| 2,606,134 | Sanders | Aug. 5, 1952 |
| 2,626,223 | Sattler et al. | Jan. 20, 1953 |

OTHER REFERENCES

"Texitle Recorder," Dec. 1946, pages 36 and 37, 260–75.

"Industrial and Engineering Chemistry," Oct. 1953, pages 2290–2295, 260–75.